US010539591B2

(12) United States Patent
Knebel et al.

(10) Patent No.: US 10,539,591 B2
(45) Date of Patent: Jan. 21, 2020

(54) MEASURING DEVICE FOR A SCANNING PROBE MICROSCOPE, SCANNING PROBE MICROSCOPE AND METHOD FOR OPERATING THE SCANNING PROBE MICROSCOPE

(71) Applicant: Bruker Nano GmbH, Berlin (DE)

(72) Inventors: Detlef Knebel, Berlin (DE); Torsten Jähnke, Berlin (DE); Jonas Hiller, Berlin (DE)

(73) Assignee: Bruker Nano GmbH, Berlin (DE)

( * ) Notice: Subject to any disclaimer, the term of this patent is extended or adjusted under 35 U.S.C. 154(b) by 0 days.

(21) Appl. No.: 16/205,629

(22) Filed: Nov. 30, 2018

(65) Prior Publication Data

US 2019/0170789 A1 Jun. 6, 2019

(30) Foreign Application Priority Data

Dec. 1, 2017 (DE) .......................... 10 2017 011 288

(51) Int. Cl.
| | |
|---|---|
| *G01Q 60/38* | (2010.01) |
| *G01Q 20/02* | (2010.01) |
| *G01Q 60/22* | (2010.01) |
| *G01Q 60/30* | (2010.01) |
| *G01Q 70/16* | (2010.01) |

(52) U.S. Cl.
CPC .............. *G01Q 60/38* (2013.01); *G01Q 20/02* (2013.01); *G01Q 60/22* (2013.01); *G01Q 60/30* (2013.01); *G01Q 70/16* (2013.01)

(58) Field of Classification Search
CPC ........ G01G 60/38; G01G 20/02; G01G 60/22; G01G 60/30; G01G 70/16
USPC ......................................... 850/40, 33, 22, 21
See application file for complete search history.

(56) References Cited

U.S. PATENT DOCUMENTS

2017/0138983 A1* 5/2017 Kim ..................... G01Q 30/02

\* cited by examiner

*Primary Examiner* — Nicole M Ippolito
*Assistant Examiner* — Hanway Chang
(74) *Attorney, Agent, or Firm* — Boyle Fredrickson S.C.

(57) ABSTRACT

The invention relates to a measuring device for a scanning probe microscope including a measuring probe a first probe holding device on which the measuring probe is arranged, a detection device including a measurement light source which is adapted to provide light beams directed toward the measuring probe, a sensor device which is adapted, during the operation to receive measurement light beams reflected from the measuring probe. A first measuring arrangement in which the first probe holding device with the measuring probe is arranged in a first position spaced from the detection device, and a second measuring arrangement is formed in which a lengthening device is changeably arranged between the detection device and the measuring probe which lengthens the respective optical beam path for the light beams and the measurement light beams in such a manner that the first probe holding device or a second probe holding device which is different from the first probe holding device is arranged with the measuring probe at a second position spacing from the detection device which is greater than the first position spacing.

13 Claims, 5 Drawing Sheets

MEASURING DEVICE FOR A SCANNING PROBE MICROSCOPE, SCANNING PROBE MICROSCOPE AND METHOD FOR OPERATING THE SCANNING PROBE MICROSCOPE

BACKGROUND OF THE INVENTION

Field of the Invention

The invention relates to a measuring device for a scanning probe microscope, a scanning probe microscope and a method for the scanning probe microscope determination of one of more measurement samples using a scanning probe microscope.

Description of Related Art

Scanning probe microscopy usually designates types of microscopy in which the image is not produced with an optical or electron optical imaging (lenses) as in the case of an optical microscope or the transmission electron microscope, but via the interaction of a so-called probe or measuring probe with the sample. In a prominent configuration, the sample surface to be investigated can be scanned by means of the measuring probe in a rasterization or scanning process point by point. The measured values resulting for the individual points can then be combined to a (digital) image. If the sample is a fluid, for example, changes in this fluid can optionally also be displayed by the measured values. For this purpose, the probe is optionally provided with a special coating.

A scanning probe microscope is constructed as compactly as possible taking into account possible auxiliary conditions in order to couple into the system only very little interference of the surroundings such as, for example, building vibrations and acoustics, or completely avoid this. As a result of the compact structure, it is then usually no longer possible to set up the measurement configuration with the scanning probe microscope for additional experimental investigations which are to take place very soon or even at the same time as the scanning probe microscope determination of the measurement sample since the components required for this cannot be brought spatially to the measurement sample in the necessary manner. As an example, additional or accompanying optical methods are mentioned herein which are to be brought as close as possible to the measuring probe, for example, the cantilever in the scanning force microscope, in order to obtain a high numerical aperture. An additional optical method can be, for example, fluorescence or Raman microscopy, an accompanying optical method can be, for example, TERS (Tip Enhanced Raman Spectroscopy), s-SNOM (scattering Scanning Nearfield Optical Microscopy) or AFM-IR (Atomic Force Microscopy based Infrared Spectroscopy).

In order to nevertheless enable a combination of different methods of investigation, compromises must be made. Thus, for example, in the case of optics, a simple lens preferably without a holder can be used. In this way however, numerous aberrations can be expected which in some cases severely restrict the experiment. A special configuration could be provided in which a scanning probe microscope structurally specially adapted to a specific experiment is used. However, then for example, the stability is lower than possible and other useful properties such as, for example, a transmitted-light optics are no longer available. Overall, the range of use of such a scanning probe microscope would be very restricted. It is therefore a burden both for the customer and also for the supplier of scanning probe microscopes since the customer must decide on a scanning probe microscope which can then only be used restrictedly and the supplier must offer different models for selection.

Components of the scanning probe microscope are a probe holding device on which the measuring probe is arranged and a detection device for detecting an interaction of the measuring probe with the measurement sample. In the case of the scanning force microscope, the probe or measuring probe is frequently a cantilever whose bending on contact with a sample is measured via a so-called light pointer. For this purpose, a measurement light source, for example a laser, is usually used which is directed onto the cantilever as mirror and is deflected by means of an angular variation of the cantilever. This deflection can be detected with a sensor device, for example, a photodiode. A further component is a scanning or displacement device which, for example, is formed by piezo-elements and allows a high spatial resolution of the scanning probe microscope.

SUMMARY OF THE INVENTION

It is the object of the invention to provide a measuring device for a scanning probe microscope, a scanning probe microscope and a method for the scanning probe microscope determination of one or more measurement samples using a scanning probe microscope by means of which the flexibility for the application-specific analysis of different measurement samples is improved.

To solve this, a measuring device is provided for a scanning probe microscope according to the independent claim 1. Furthermore, a scanning probe microscope according to claim 12 and a method for the scanning probe microscope determination of one or more measurement samples using a scanning probe microscope according to claim 13 are provided. Embodiments are the subject matter of dependent claims.

According to one aspect, a measuring device for a scanning probe microscope is provided. The measuring device comprises a measuring probe as well as a first probe holding device on which the measuring probe is arranged or held. A detection device comprises a measurement light source which is adapted to provide light beams for the scanning probe microscope determination or analysis of a measurement sample. A sensor device of the detection device is adapted, during the scanning probe microscope determination of the measurement sample upon incidence of the light beams on a reflection device assigned to the measuring probe, to receive measurement light beams reflected from this device, wherein the light beams and the measurement light beams during the scanning probe microscope determination of the measuring probe run along a respective optical beam path or course of beam. The measuring device furthermore has a sample holder which is adapted to hold the measurement sample for the scanning probe microscope determination. For the respective scanning probe microscope determination of the measurement sample a first and a second measuring arrangement can be formed. In the first measuring arrangement the first probe holding device with the measuring probe is arranged in a first position spacing from the detection device. In the second measuring arrangement a lengthening device is changeably arranged between the detection device and the measuring probe which lengthens the respective optical beam path for the light beams and the measurement light beams in such a manner that the first probe holding device or a second probe holding device which is different from the first probe holding device is arranged with the measuring probe at a second position spacing from the detection device which is greater than the first position spacing.

Furthermore a scanning probe microscope having the aforesaid measuring device is provided.

According to a further aspect, a method for the scanning probe microscope determination of one or more measurement samples using a scanning probe microscope is provided. In the method, a scanning probe microscope is provided with a measuring probe and a first probe holding device on which the measuring probe is arranged. One or more measurement samples are determined using scanning probe microscopy by means of a first and a second measurement arrangement of the scanning probe microscope. The first and the second can therefore be used to investigate one and the same measurement sample or different measurement samples by means of scanning probe microscopy. In the scanning probe microscope determination, the following is executed in each case: light beams which are provided by a measurement light source of a detection device are emitted onto a reflection device assigned to the measuring probe; and the measurement light beams which upon incidence of the light beams on the reflection device assigned to the measuring probe are reflected by this device, are received by means of a sensor device of the detection device. The light beams and the measurement light beams run along a respective optical beam path or course of beam during the scanning probe microscope determination of the measurement sample. In the first measurement arrangement the detection device and the probe holding device with the measuring probe are arranged in a first position spacing from one another. In order to form the second measuring arrangement, a lengthening device is changeably arranged between the detection device and the measuring probe which lengthens the respective optical beam path for the light beams and the measurement light beams in such a manner that the first or a second probe holding device which is different from the first probe holding device is arranged with the measuring probe at a second position spacing from the detection device which is greater than the first position spacing.

By means of the detachable installation of the lengthening device between the detection device and the probe holding device, it is possible to provide different measurement arrangements with one and the same detection device and thus perform different measurement tasks with the measuring device or the scanning probe microscope. By means of the lengthening device, the position spacing or distance between the detection device and the probe holding device is enlarged. This makes it possible to bring one or more further measuring devices or components of such measuring devices close to the measurement sample on the sample holder, wherein this is not impeded by the position spacing between the detection device and the probe holding device as a result of the lengthening device, such as it can be the case in the first measurement arrangement. Rather, the second measurement arrangement provides a greater flexibility for executing the scanning probe microscope analyses in that the enlarged distance between the detection device and the probe holding device enables the use of various further measuring devices, for example, bringing an objective for an optical microscopic analysis of the measurement sample on the sample holder. The measurement sample can thus, for example, be examined experimentally with the scanning probe microscope and a further measuring device, for example an optical microscope.

The interaction of the measuring probe with the measurement sample in (experimental) scanning probe microscope analyses is recorded by detecting the measurement light beams reflected at the reflection device. This measurement method is also known as such by the term light pointer principle.

By means of the lengthening device, a macroscopic position spacing is formed between the detection device and the probe holding device which remains substantially the same in the scanning probe microscope analysis of the measurement sample when the detection device and the probe holding device are optionally (jointly) displaced with the aid of the displacement or scanning device relative to the measurement sample on the sample holder.

The measuring probe can for example be a cantilever for a scanning probe microscope which can then be implemented as a scanning force microscope.

The detection device can comprise a laser as a measurement light source. In order to form the sensor device, the detection device can have one or more photodiodes. For adjusting the beam path or the course of beam for the light beams and/or the measurement light beams, the measurement light source and/or the sensor device of the detection device can be adjustable within predefined device tolerances.

The measuring probe can be mounted detachably or non-detachably on the probe holding device. The probe holding device can, for example, be formed with a block component on which the measuring probe is arranged, for example, a glass block. The probe holding device can have a kinematic holder. This is characterized in that all degrees of freedom are clearly constrained and can, for example, be implemented whereby three balls lie in three grooves.

An exchangeable probe holding device can be provided so that it is possible to work in the first measurement arrangement with the first probe holding device and in the second measurement arrangement with the second probe holding device which is adapted to hold the measuring probe and which is different from the first probe holding device.

The lengthening device can be designed to be one-piece or multi-piece. In the case of a multi-piece device, subsections of the lengthening device can form an assembly set, whereby, for example, lengthening devices of different length can be formed.

The lengthening device can be mounted detachably on the detection device in the second measurement arrangement. The lengthening device is in this case mounted or received on the detection device with the aid of a coupling or connecting mechanism, which enables the mounting or dismounting of the lengthening device on the detection device, for example, on an outer surface of a housing of the detection device. Alternatively, the lengthening device can be held with respect to the detection device separately therefrom with the aid of an associated holding device. The holding device is then expediently adapted to displace the lengthening device simultaneously with the detection device and the probe holding device with the measuring probe during the scanning probe microscope determination of the measurement sample.

The lengthening device can be mounted detachably on the detection device by means of a magnetic coupling or connecting device. The magnetic coupling device can be formed with several permanent magnets which can be provided on the lengthening device on the one hand and on the detection device on the other hand. The magnetic coupling device can be configured to allow for a horizontal relative displacement between lengthening device and detection device.

The lengthening device can in the second measurement arrangement be detachably connected to the first or the second probe holding device. In contrast, the probe holding device in the first measurement arrangement can be received detachably on the detection device. In order to form the second measurement arrangement, the probe holding device can be detached or removed from the detection device in order to introduce the lengthening or extension device between detection device and probe holding device. A further magnetic coupling device can be provided between the lengthening device and the probe holding device. In the second measurement arrangement, therefore, the lengthening device can be detachably connected to each of the detection device on the one hand and the probe holding device on the other hand, for example, with the aid of a respective magnetic coupling device.

The lengthening device can be adapted in the second measurement arrangement to image or make incident the measurement light beams within a tolerance range for an adjustability of the sensor device in a sensor surface area of the sensor device on which the measurement light beams are imaged in the first measurement arrangement. Within the tolerance range for the adjustability of the sensor device, for example, a displaceability of the sensor surface transversely to the light incidence of the measurement light beams, the measurement light beams are imaged in the same sensor surface region of the sensor device both in the first and in the second measurement arrangement. The lengthening of the respective optical beam path for the light beams and the measurement light beams in the second measurement arrangement is accomplished in such a manner that the incidence of the measurement light beams on the sensor surface of the sensor device within the tolerance range for the adjustability of the sensor device remains the same. This assists a change between the first and the second measurement arrangement with the lowest possible effort.

The lengthening device can be adapted when lengthening the respective optical beam path for the light beams and the measurement light beams to substantially maintain a point-of-intersection region between light beams after leaving the detection device and measurement light beams before incidence on the sensor device. The size of the point-of-intersection region can in particular be influenced and limited by tolerance ranges for the settability or adjustability of the measurement light source and the sensor device in the detection device. The maintaining of further point-of-intersection regions for the light beams and the measurement light beams can be provided.

The lengthening device can be adapted in the second measuring arrangement to substantially maintain a surface size of a light spot in which the light beams are imaged optically onto or incide on the reflection device assigned to the measuring probe in the first measuring arrangement. The surface size of the light spot can be substantially maintained within tolerance and adjustment ranges of the detection device and of optical elements of the lengthening device, wherein changes in the light spot of about 10 to about 30%, alternatively of about 10 to 90%, can be covered thereof. In the second measurement arrangement, the surface size of the light spot can be larger or smaller than in the first measurement arrangement.

The lengthening device can have at least one optical component which is arranged in the optical beam path of the light beams and/or the optical beam path of the measurement light beams. The optical components can, for example, comprise light-reflecting components such as mirrors and/or lenses as well as lens arrangements. The at least one optical component can be arranged adjustably or fixedly non-adjustably in the lengthening device.

The lengthening device can be adjustable to change the second position spacing between the detection device and the first or the second probe holding device. In this embodiment, one and the same lengthening device provides at least two different position spacings between the detection device of the probe holding device, as the length of the lengthening device is adjustable, for example, whereby components of the lengthening device are joined together more closely by means of screw or plug connections or can be spaced further apart from one another. Alternatively or additionally, it can be provided that the measuring device comprises an assembly set with several lengthening devices, each of which can be installed exchangeably forming a different position spacing.

In the second measurement arrangement underneath the detection device, an observation region extending to the measurement sample can be provided for a measuring device which is designed to be free from any collision with the lengthening device. For example, an observation region can be provided for an optical measuring device. The observation region for the measurement device can be designed to be free from any collision with the probe holding device. The observation region can, for example, be a (conical) viewing region of an objective for an optical microscope examination, for example, a viewing region of an optical microscope. In this case, the objective itself can be arranged so that it projects into a region underneath the detection device.

A displacement device can be adapted to displace the measuring probe and the measurement sample relative to one another on the sample holder for the scanning probe microscope determination.

In connection with the scanning probe microscope and the method for the scanning probe microscope determination of the one or more measurement samples using the scanning probe microscope, the embodiments explained previously in connection with the measuring device can be provided accordingly.

Further aspects are explained hereinafter. It can be provided that a detachable connection between the detection device and the lengthening device comprises a holder on which the probe holding device can be attached. It can also be provided to implement a different probe holder which benefits the special requirements of the additional experiment. Various detachable connections or connection mechanisms can be provided for different experiments.

The detachable connection can be configured so that it can further use the detection device. For an electrical application such as a "tuning fork", a cable lengthening is possibly provided which is integrated if possible. For the light pointer in the scanning force microscope, a lengthening of the optical beam path is provided which is configured so that both the light is incident on the newly positioned cantilever and also the reflected light (measurement light beams) is again incident on the sensor device.

The detachable connection can be configured to that it detaches at least partially from the scanning probe microscope under higher mechanical forces. For this purpose, for example, a magnetic probe holder is suitable which can be implemented as a kinematic probe holder. The background of this easily detachable connection is that by lengthening the structure, substantially higher torques can occur under the same application of force or also handling the somewhat more cumbersome scanning probe microscope results in an incorrected handling and this could, for example, damage the sensitive scanning or displacement device. Thus, for example, a collision when aligning the further experiment such as, for example an optics, is not always avoidable.

If the lengthening device is fixed by means of an easily detachable connection, the probe holding device itself can also be fixed by means of such a, for example, magnetic connection. The advantage would be the possibility of a rapid change of measuring probes.

A fixed mechanical probe holder can be provided in which an adapter is fixed which itself provides a readily detachable holder. Here, the detachable connection or a normal probe holding device could then easily be fixed detachably. For special applications such as, for example, very rapid movements, in particular in lateral direction, a special probe holding device can be introduced into the fixed holder.

BRIEF DESCRIPTION OF THE DRAWINGS

Further exemplary embodiments are explained in detail hereinafter with reference to figures of the drawings. In the figures.

DETAILED DESCRIPTION OF THE PREFERRED EMBODIMENTS

Figure 1B:
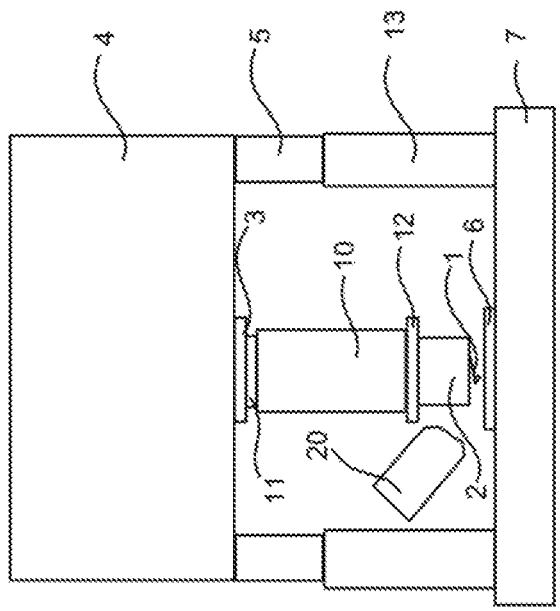
FIG. 1b shows a schematic diagram of the measuring device from FIG. 1a with a second measurement arrangement in which a lengthening device is arranged between a detection device and a probe holding device.
Figure 1A:
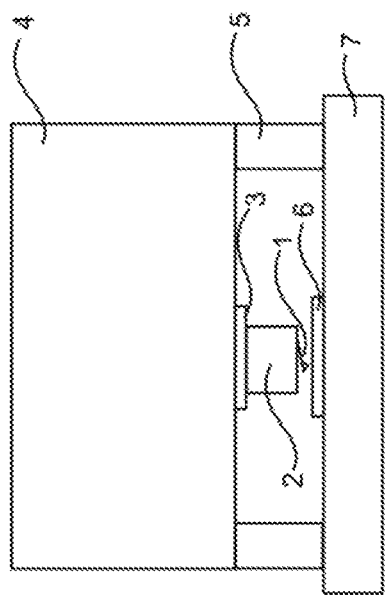
FIG. 1a shows a schematic diagram of a measuring device for a scanning probe microscope with a first measurement arrangement.

FIG. 1a shows a schematic diagram of a measuring device for a scanning probe microscope 4 with a first measurement arrangement. The scanning probe microscope 4 has standing feet 5 which are usually motorized for a coarse approach. The motors can be part of the sample holder 7. A measuring probe 1 implemented in the example as a cantilever is further shown, the cantilever being attached to a probe holder 2 (probe holding device), wherein the latter is in turn fastened to the scanning probe microscope 4 by means of a holder or coupling 3. In the example shown, the holder 3 is firmly connected to the scanning probe microscope 4.

Further, a sample receptacle or sample holder 7 and a measurement sample 6 arranged thereon are shown. In this respect, this is a compact instrument with restricted accessibility to the measurement sample 6.

FIG. 1b shows a schematic diagram of the measuring device of the scanning probe microscope 1 from FIG. 1a with a second measurement arrangement. An objective 20 is additionally shown as an example for a further experiment, the greatest spacing of which from the sample holder 7 is greater than the spacing between the scanning probe microscope 4 and the sample holder 7 in FIG. 1a. The arrangement of the objective 20 is made possible by the detachably mounted extension or lengthening 10 which can be fixed on the holder 3 by means of an adapted holder 11. In order to avoid extensive modifications, the sample holder 7 is provided with lengthened receptacles 13 for the standing feet 5. A detachable lengthening of the standing feet 5 would also be feasible. The extension 10 further contains an assigned holder 12 which enables the probe holder 2 to be received. Measuring probe 1 is a cantilever in the example, but other measuring probes can also be used.

Figure 2A:
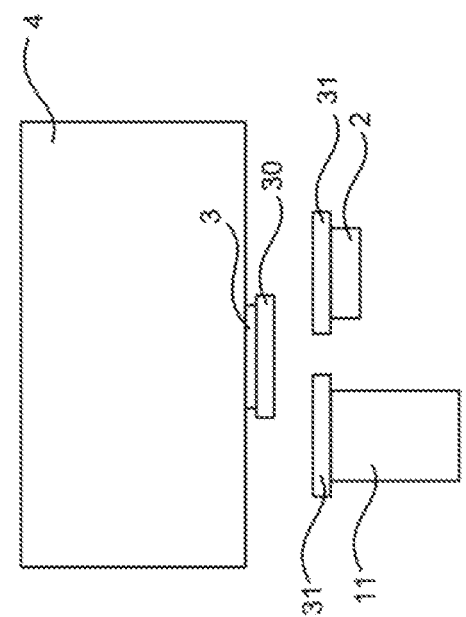
FIGS. 2a, 2b show schematic diagrams of a magnetic holder for the detachable mounting of a probe holding device or an extension or lengthening device.
Figure 2B:
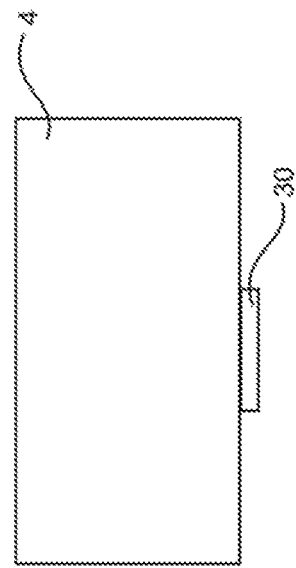

FIGS. 2a and 2b show schematic diagrams of a magnetic holder for the detachable mounting of the probe holding device 2 or the extension or lengthening device 10.

The probe holder 2 comprises a component 31 with which a readily detachable, for example, a magnetic connection with the component 30 can be implemented. For this purpose, in this example both components 30 and 31 contain magnets which are preferably designed as permanent magnets. Alternatively, one of the components can merely contain a magnetizable substance, such as, for example, iron. The component 30 is connected via the holder 3 to the microscope 4 and itself detachable from the latter. The detachable extension can also be coupled to 30 via an identical holder 31. In FIG. 2b, it is also shown that in a possible embodiment of the scanning probe microscope, the holder 30 can also be integrated directly in the microscope 4, with the result that only readily detachable connections would be possible for the user.

Figure 3B:
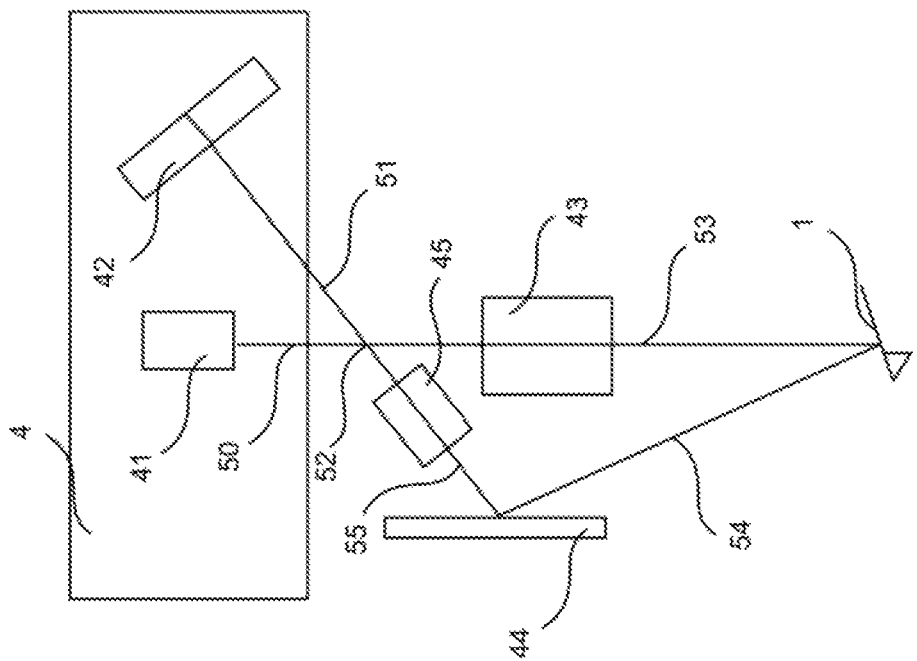
FIG. 3b shows a schematic diagram of the measuring device with light pointer from FIG. 3a with a second measurement arrangement in which the lengthening device is arranged between the detection device and the probe holding device.
Figure 3A:
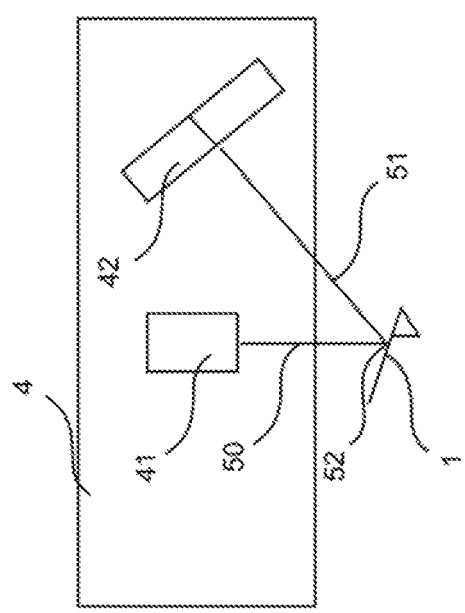
FIG. 3a shows a schematic diagram of a measuring device with light pointer for a scanning probe microscope with a first measurement arrangement.

FIG. 3a firstly shows the detection device in an embodiment as a light pointer which is part of the scanning probe microscope 4. It essentially contains a light source 41, for example a laser with focussing unit, whose emitted light beam 50 is reflected from the cantilever 1 at the point 52 and is incident as deflected light beam 51 on a photodiode 42 which, for example, is designed as four-quadrant diode in order to detect a deviation of the light beam in lateral direction. If the cantilever 1 in FIG. 3b is now offset to a different location, the task in the detachable extension consists in using the light beam 51 and after a reflection at the cantilever 4 deflecting the light beam so that on the return path it runs close to the beam profile 51 or precisely on it so that the photodiode is impinged unhindered. For the measuring head 4 it makes no difference where the cantilever is located. In the real device, the beam profile 51 is usually more complex and can also include optical components. In the optimal case, the light beams thus passes close to the point 52 on the return path.

Specifically, it is implemented in the shown exemplary embodiment such that the laser 51 which is usually focussed on the cantilever 1 in FIG. 1a is guided as far as an optical system 43, for example a lens system, which performs a renewed focussing onto the cantilever 1. Without the lens system, the light beam would be much larger than the cantilever and too low power would be reflected. The beam 53 is then deflected from the cantilever 1 and the deflected beam 54 is deflected by means of a mirror 44 and forms the beam 55 which runs parallel or almost parallel to the beam 51 and at no distance or only a short distance therefrom. It can be further provided that the angle and optionally also the location of the mirror can be adjusted to optimize overlap. It can be further provided to provide a further optical system 45 which ensures that the light beam after focussing does not open too far and in this way does not impinge completely on the photodiode. Unlike the drawing, the further optical system can also have assemblies between the mirror 44 and the probe 1 or as a divided system at both locations. Optionally, in addition to a reflection, e.g., due to a suitable curvature, the mirror itself can also form the further optical system.

Figure 4A:
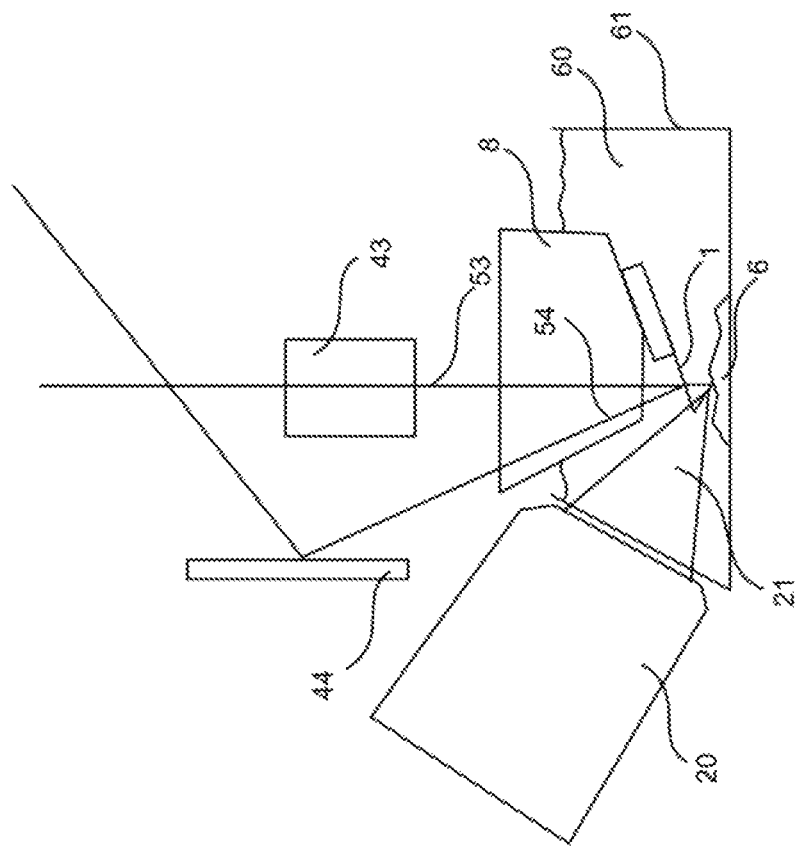
FIGS. 4a, 4b show schematic diagrams for use of a lengthening device in a measuring device for a scanning probe microscope for the scanning probe microscope determination of a measurement sample in air or in a liquid
Figure 4B:
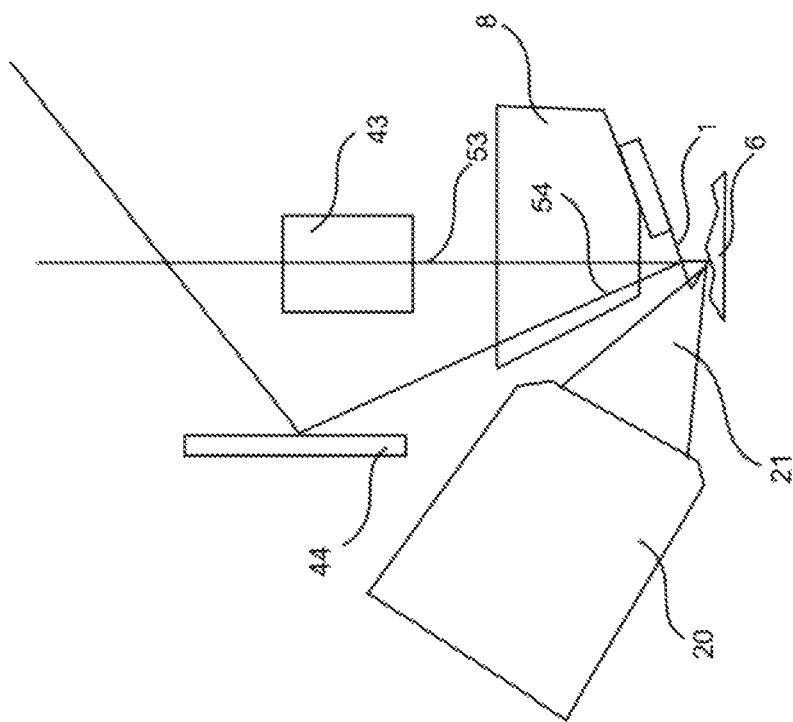

FIG. 4 shows a possible application of the device in which the further experiment is an optical method 20, 21, such as, for example, fluorescence microscopy or Raman microscopy. In this configuration, the cantilever holder 8 is optimally designed so that the beam path 21 from the objective 20 can impinge upon the sample 6 unhindered by the cantilever holder 8. This experiment can be carried out in air, FIG. 4*a*, as well as in a fluid, FIG. 4*b*. For an application in a fluid, merely a fluid chamber is required which is preferably formed on the side of the optics perpendicular to the beam profile 21. In this way, the objective 20 can move closer to the sample. In addition, the optical beam path 21 through a parallel plate perpendicular to the beam direction is less influenced than by an oblique plate or even a curved plate, such as in the case of a Petri dish. In both cases, it must be ensured that the beams 21 and 54 do not overlap. It should be noted that for the beam 54 only the central beam is depicted, however, the opening angle of the beam is only a few degrees. For a precise calculation of the geometrical arrangement, it should preferably be included. The angle between 53 and 54 can be further reduced, however, it must be ensured that the cantilever can still be effectively held and in particular the beam 54 must be passed completely past the optics 43.

In FIG. 5, it is shown how the easily detachable connection can be used for an automation of the change of probe. Usually, the probes 1, for example the cantilevers, are very small, for example a few mm. These small probes must now be held and fastened to the probe holder 2. The loosening of the fixed connection 3, as was shown for example in FIG. 1, must also be accomplished. Accordingly, a relatively complex apparatus would be required. An extension of the inventive easily detachable holder 30, 31 allows an exchange of the complete probe holder 2 with pre-mounted probes. For this purpose, holes 72 are provided on an underlay 70 which are provided with a shoulder 71. Here, the cross-section of the shoulder 71 should be only slightly greater than the one of the probe holder 2. In this way, probes of the same kind or also different probes can be set in several shoulders 71. A circular formation of the shoulders and the cantilever holder would certainly be most simple, but this does not always permit the planned experiment. Here, the hole 72 prevents the probe from being placed thereon.

Figure 5A:
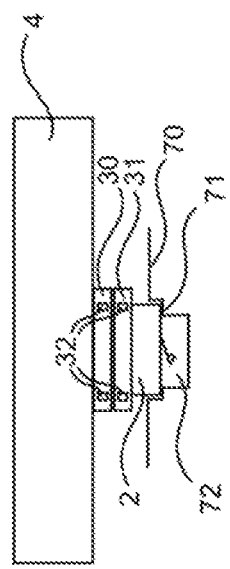
FIGS. 5a to 5c show schematic diagrams for an automation of a change of a measuring probe.
Figure 5B:
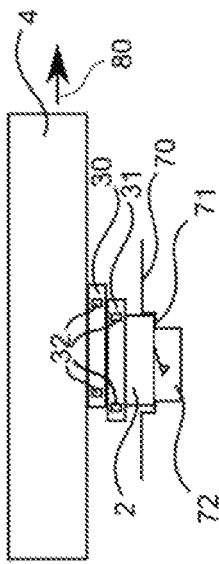
Figure 5C:
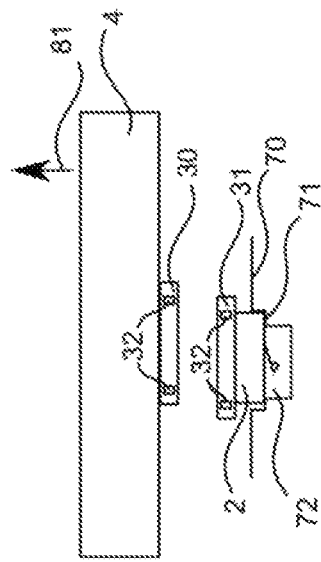

The setting down of the probe holder 2 can take place as shown in FIGS. 5*a* to 5*c*. In FIG. 5*a*, the measuring head 4 is shown with the holder 30 which in this exemplary embodiment is provided with the magnets 32. In this example, the opposite side 31 is also fitted with magnets 32. The attraction force is adjusted appropriately by the spacing of the magnets and their size and magnetic strength. In FIG. 5*a*, the probe holder 2 is fixed on the measuring head 4 via the forces between 30, 31. In FIG. 5*b*, the measuring head is displaced with a suitable lateral displacement, such as for example a motorized displacement device, somewhat in the lateral direction 80. The probe holder cannot move therewith since it is fixed by the shoulder 71. In this way, the magnets 32 of the holders 30 and 31 no longer lie one above the other at the end of the movement 80 and accordingly no force or only a very small force is acting. It is thereby possible, as shown in FIG. 5*c*, to move the measuring head 4 upwards by means of a vertical movement 81, for example by means of the motorized standing feet 5 from FIG. 1, and thereby let the probe holder back into the holder 71, 72. The measuring head 4 can then be moved to another probe holder and receive the latter by lowering. In this case, the magnets 32 of the holders 30, 31 must then lie one above the other again.

The features disclosed in the preceding description, the claims, and the drawing can be of importance both individually and also in any combination for implementing the various embodiments.

What is claimed is:

1. A measuring device for a scanning probe microscope comprising:
   a measuring probe;
   a first probe holding device on which the measuring probe is arranged;
   a detection device comprising,
      a measurement light source which is adapted to provide light beams for the scanning probe microscope determination of a measurement sample; and
      a sensor device which is adapted, during the scanning probe microscope determination of the measurement sample upon incidence of the light beams on a reflection device assigned to the measuring probe, to receive measurement light beams reflected from this device, wherein the light beams and the measurement light beams during the scanning probe microscope determination of the measuring probe run along a respective optical beam path; and
   a sample holder which is adapted to hold the measurement sample for the scanning probe microscope determination;
   wherein for the respective scanning probe microscope determination of the measurement sample
      a first measuring arrangement in which the first probe holding device with the measuring probe is arranged in a first position spacing from the detection device; and
      a second measuring arrangement can be formed in which a lengthening device is changeably arranged between the detection device and the measuring probe which lengthens the respective optical beam path for the light beams and the measurement light beams in such a manner that the first probe holding device or a second probe holding device which is different from the first probe holding device is arranged with the measuring probe at a second position spacing from the detection device which is greater than the first position spacing.

2. The measuring device according to claim 1, characterized in that the lengthening device is mounted detachably on the detection device in the second measurement arrangement.

3. The measuring device according to claim 2, characterized in that the lengthening device is mounted detachably on the detection device by means of a magnetic coupling device.

4. The measuring device according to claim 1, characterized in that in the second measurement arrangement, the lengthening device is detachably connected to the first or the second probe holding device.

5. The measuring device according to claim 1, characterized in that the lengthening device is adapted in the second measurement arrangement to image the measurement light beams within a tolerance range for an adjustability of the sensor device in a sensor surface area of the sensor device on which the measurement light beams are imaged in the first measurement arrangement.

6. The measuring device according to claim 1, characterized in that the lengthening device is adapted when lengthening the respective optical beam path for the light beams and the measurement light beams to maintain a point-of-intersection region between light beams after leaving the detection device and measurement light beams before incidence on the sensor device.

7. The device according to claim 1, characterized in that the lengthening device is adapted in the second measuring arrangement to substantially maintain a surface size of a light spot in which the light beams are imaged optically onto the reflection device assigned to the measuring probe in the first measuring arrangement.

8. The measuring device according to claim 1, characterized in that the lengthening device has at least one optical component which is arranged in the optical beam path of the light beams and/or the optical beam path of the measurement light beams.

9. The measuring device according to claim 1, characterized in that the lengthening device is adjustable to change the second position spacing between the detection device and the first or the second probe holding device.

10. The measuring device according to claim 1, characterized in that in the second measurement arrangement underneath the detection device, an observation region extending to the measurement sample is provided for a measuring device which is designed to be free from any collision with the lengthening device.

11. The measuring device according to claim 1, characterized in that a displacement device which is adapted to displace the measuring probe and the measurement sample relative to one another on the sample holder for the scanning probe microscope determination.

12. A scanning probe microscope having a measuring device according to claim 1.

13. A method for the scanning probe microscope determination of one or more measurement samples using a scanning probe microscope comprising:

providing a scanning probe microscope with a measuring probe and a first probe holding device on which the measuring probe is arranged; and scanning probe microscope determination of one or more measurement samples by means of a first and a second measurement arrangement of the scanning probe microscope, wherein the second measurement arrangement differs from the first measurement arrangement and wherein here in each case light beams which are provided by a measurement light source of a detection device are emitted onto a reflection device assigned to the measuring probe; and measurement light beams which upon incidence of the light beams on the reflection device assigned to the measuring probe are reflected by this device, are received by means of a sensor device of the detection device;

wherein the light beams and the measurement light beams run along a respective optical beam path during the scanning probe microscope determination of the measurement sample;

in the first measurement arrangement, the detection device and the first probe holding device with the measuring probe are arranged in a first position spacing from one another and in order to form the second measuring arrangement, a lengthening device is changeably arranged between the detection device and the measuring probe which lengthens the respective optical beam path for the light beams and the measurement light beams in such a manner that the first or a second probe holding device which is different from the first probe holding device is arranged with the measuring probe at a second position spacing from the detection device which is greater than the first position spacing.

* * * * *